United States Patent [19]

Nishii

[11] Patent Number: 5,081,841
[45] Date of Patent: Jan. 21, 1992

[54] HYDRAULIC BRAKING SYSTEM WITH SECOND BOOSTER CHAMBER

[75] Inventor: Michiharu Nishii, Toyota City, Japan

[73] Assignee: Aisin Seiki Kabushiki Kaisha, Kariya City, Japan

[21] Appl. No.: 588,183

[22] Filed: Sep. 26, 1990

[30] Foreign Application Priority Data

Sep. 30, 1989 [JP] Japan .................................. 1-256849

[51] Int. Cl.⁵ .............................................. F15B 7/00
[52] U.S. Cl. .......................................... 60/56; 60/567; 60/591
[58] Field of Search ..................... 60/533, 547.1, 549, 60/560, 562, 567

[56] References Cited

U.S. PATENT DOCUMENTS

| | | | |
|---|---|---|---|
| 3,939,658 | 2/1976 | Horvath | 60/548 |
| 3,978,667 | 9/1976 | Ohara | 60/547.1 X |
| 4,311,085 | 1/1982 | Runkle | 60/547.1 X |
| 4,586,591 | 5/1986 | Belhart | 60/547.1 X |
| 4,687,259 | 8/1987 | Reinartz et al. | 60/547.1 X |
| 4,708,405 | 11/1987 | Belhart et al. | 60/547.1 X |
| 4,720,151 | 1/1988 | Belart et al. | 188/345 |
| 4,736,588 | 4/1988 | Leiber | 60/562 X |
| 4,745,750 | 5/1988 | Belart et al. | 60/547.1 |
| 4,749,240 | 6/1988 | Burgdorf | 60/547.1 X |
| 4,843,819 | 7/1989 | Leiber | 60/567 X |
| 4,876,853 | 10/1989 | Shirai et al. | 60/547.1 |
| 4,986,613 | 1/1991 | Nishii et al. | 60/547.1 X |
| 5,010,732 | 4/1991 | Yogi | 60/413 |

Primary Examiner—Edward K. Look
Assistant Examiner—John Ryznic
Attorney, Agent, or Firm—Burns, Doane, Swecker & Mathis

[57] ABSTRACT

The invention is directed to a hydraulic braking system for an automotive vehicle having a power source for generating a hydraulic power pressure, a reservoir, a master cylinder, a hydraulic booster for actuating the master cylinder in response to depression of a brake pedal and a plurality of wheel brake cylinders for braking respective road wheels. The hydraulic booster has a power piston for actuating a master piston of the master cylinder, and defines a first boost chamber which introduces the hydraulic power pressure from the power source to apply to the power piston, and a second boost chamber which is separated from the first boost chamber by the power piston and which introduces a hydraulic pressure from the first boost chamber to actuate the master piston. And, valve means is disposed between the first and second boost chambers and controls the communication therebetween to provide a variable characteristic of the pressure applied to the master cylinder in response to the depressing force applied on the brake pedal.

11 Claims, 5 Drawing Sheets

DEPRESSING FORCE

DEPRESSING FORCE

HYDRAULIC BRAKING SYSTEM WITH SECOND BOOSTER CHAMBER

BACKGROUND OF THE INVENTION

1. Field of the Invention

The present invention relates to a hydraulic braking system for use in an automotive vehicle, and more particularly to a hydraulic braking system which has a hydraulic booster for actuating a master cylinder in response to operation of a manually-operated member with a hydraulic power pressure supplied from a power source.

2. Description of the Prior Art

In conventional service braking systems for an automotive vehicle, there are provided a plurality of hydraulic circuits connecting wheel brake cylinders mounted on road wheels with a hydraulic braking pressure generator such as a master cylinder, so that when one of the hydraulic circuits is broken, braking operation is performed by the rest of the hydraulic circuits. In general, a tandem master cylinder is used in a conventional dual circuits system.

In order to reduce a force required to operate a manually-operated member, for example a depressing force applied on a brake pedal in braking operation, the hydraulic braking system is provided with a servo unit which is referred as a servo or a booster and which utilizes compressed air, intake manifold vacuum (for a vacuum booster), or hydraulic pressure (for a hydraulic booster) as a power source. The hydraulic booster is a booster which actuates the hydraulic braking pressure generator such as the master cylinder by the hydraulic power pressure supplied from the power source in response to depression of the brake pedal.

It has been proposed to employ the hydraulic booster, in the hydraulic braking system, as a dynamic hydraulic braking pressure generator in addition to the master cylinder. In other words, a hydraulic pressure generated by the hydraulic booster in response to depression of the brake pedal is applied directly to one of the hydraulic circuits. For example, as shown in Japanese Patent Laid-open Publication No. 59-227552, the hydraulic pressure generated by the hydraulic booster is applied to rear wheel brake cylinders in a front-rear dual circuits system in order to reduce the stroke of the brake pedal.

In Japanese Patent Laid-open Publication Nos. 62-244750 and 62-244751, there is disclosed a hydraulic booster of so-called stroke jumping type in which a power piston is divided into two pieces, one of which is moved relative to the other immediately after depression of the brake pedal to compensate for an initial idle stroke of the brake pedal. Therefore, the stroke of the brake pedal or the manually-operated member may be reduced.

However, in the above-described hydraulic braking systems, the characteristic of the hydraulic braking pressure in the wheel brake cylinder increasing in response to increase of the depressing force applied on the brake pedal, indicates a linear characteristic, so that a large depressing force must be applied on the brake pedal when a large braking force is needed. While it is preferable that the characteristic of the hydraulic braking pressure increasing in response to increase of the depressing force applied on the brake pedal is variable to meet a driver's choice or various driving characteristics, the characteristic in the above-described prior hydraulic braking system having the hydraulic booster can not be made variable.

SUMMARY OF THE INVENTION

Accordingly, it is an object of the present invention to provide a hydraulic braking system for an automotive vehicle which has a hydraulic booster and provides a variable characteristic of a hydraulic braking pressure in a wheel brake cylinder increasing in response to increase of a force of a manually-operated member.

It is another object of the present invention to provide a hydraulic braking system which increases a hydraulic braking pressure in a wheel cylinder to provide a non-linear characteristic in response to increase of a force of a manually-operated member.

It is a further object of the present invention to provide a hydraulic braking system which is easily and economically provided with means for varying a characteristic of a hydraulic braking pressure in a wheel brake cylinder.

In accomplishing these and other objects, a hydraulic braking system for an automotive vehicle according to the present invention comprises a power source for generating a hydraulic power pressure, a reservoir for storing an amount of brake fluid, a master cylinder for introducing the brake fluid thereinto from the reservoir and generating a hydraulic braking pressure in response to operation of a manually-operated member, a hydraulic booster having a power piston for actuating the master cylinder with the hydraulic power pressure supplied from the power source in response to operation of the manually-operated member, and a plurality of wheel brake cylinders communicated with at least the master cylinder for braking respective road wheels. The hydraulic booster defines therein a first boost chamber for introducing the hydraulic power pressure to apply to the power piston, and a second boost chamber separated from the first boost chamber by the power piston for actuating the master cylinder independently of the power piston. The hydraulic braking system further includes valve means for controlling the communication between the first boost chamber and the second boost chamber.

In the above-described hydraulic braking system, the valve means preferably comprises a changeover valve selectively placed in one of a first operating position for communicating the first boost chamber with the second boost chamber, and a second operating position for blocking the communication therebetween.

The valve means may comprise a delay valve for blocking the communication between the first boost chamber and second boost chamber until a hydraulic pressure in the first boost chamber exceeds a predetermined value.

Further, the valve means may comprise a pressure control valve for controlling a hydraulic pressure supplied to the second boost chamber in response to a hydraulic pressure discharged from the first boost chamber.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
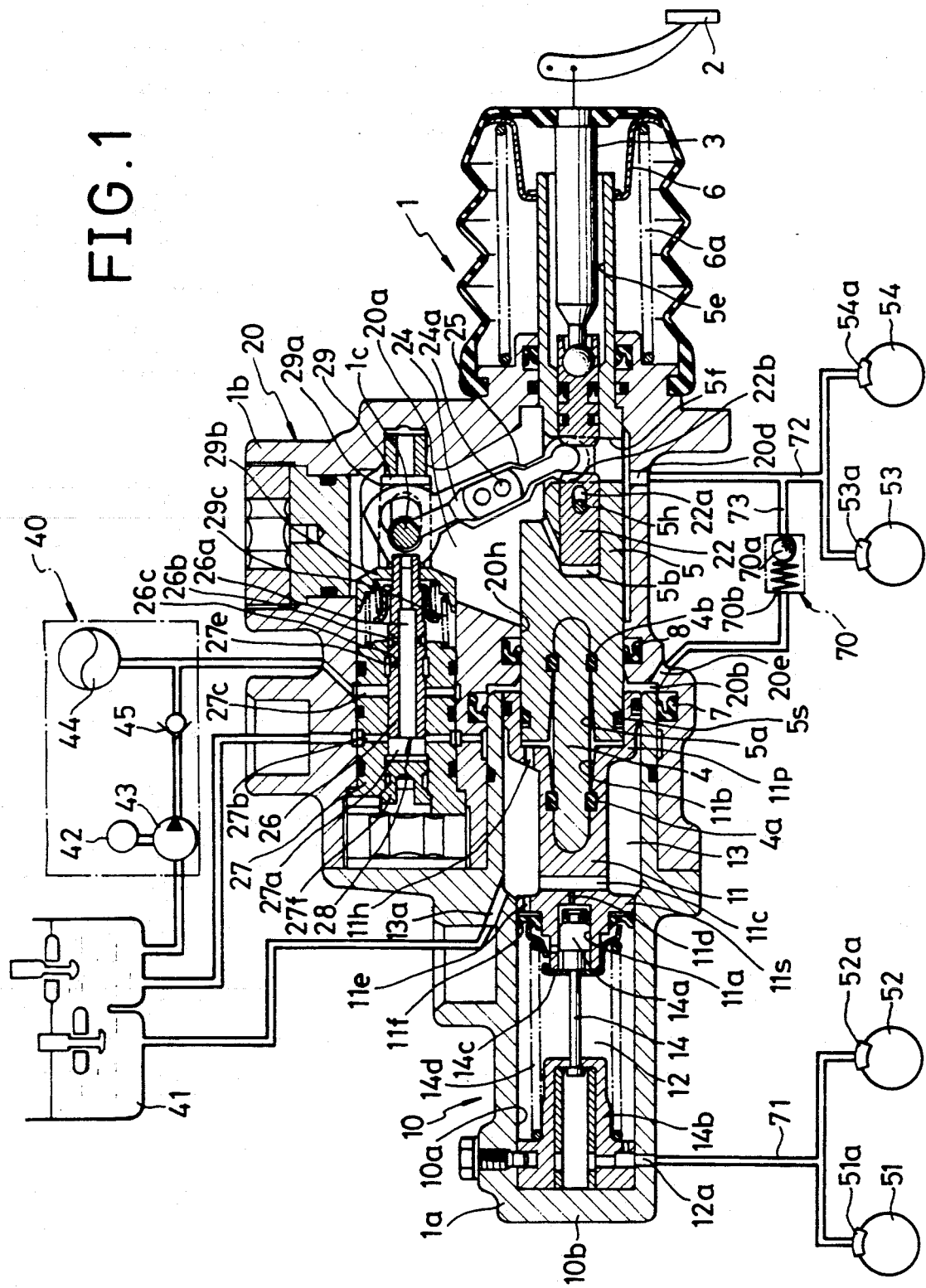
FIG. 1 is a schematic illustration of a hydraulic braking system of a first embodiment of the present invention with a sectional view of a hydraulic pressure generator.

Referring to FIG. 1, there is illustrated a hydraulic braking system of an embodiment of the present invention, which includes a hydraulic pressure generator 40 (hereinafter referred to simply as a pressure generator) 1 having a master cylinder 10 and a hydraulic booster 20. A power source 40 and a reservoir 41 are connected to the pressure generator 1. A depressing force applied on a brake pedal 2 which is provided as a manually-operated member is transmitted as a braking force to the pressure generator 1. In response to this braking force, a hydraulic pressure is generated by the pressure generator 1 and applied to wheel brake cylinders 51a to 54a mounted on front road wheels 51, 52 and rear road wheels 53, 54 through hydraulic circuits 71, 72.

As for the master cylinder 10, a master piston 11 is fluid-tightly and slidably disposed in a cylinder bore 10a defined in a housing 1a. The master piston 11 has a small-diameter land portion 11s and a large-diameter land portion 11p, and the cylinder bore 10a is formed as a stepped bore having corresponding small-diameter and large-diameter portions. The large-diameter land portion 11p of the master piston 11 is disposed within the large-diameter portion of the cylinder bore 10a, in which a fluid chamber 13 is defined between the small-diameter land portion 11s and the large-diameter land portion 11p of the master piston 11. In the small-diameter portion of the cylinder bore 10a, a pressure chamber 12 is defined between the small-diameter land portion 11s of the master piston 11 and a closed end portion 10b. The pressure chamber 12 communicates with the wheel brake cylinders 51a, 52a through a port 12a and the hydraulic circuit 71, while the fluid chamber 13 communicates with the reservoir 41 through a port 13a.

The master piston 11 has a hole 11a at its small-diameter land portion 11s's side and a stepped opening 11b at its large-diameter land portion 11p's side extending axially from its opposite ends toward its center, and also a hole 11c formed radially. The hole 11a communicates with the hole 11c through a small hole 11d formed axially. Also, a hole 11e is formed axially in a peripheral portion of the master piston 11, and covered by a cup seal 11f at its end portion open to the pressure chamber 12, whereby a check valve is formed. A valve member 14a mounted on one end of a valve rod 14 is slidably received in the hole 11a of the master piston 11 in opposed relationship with the small hole 11d, and the valve member 14a is restrained from moving toward the closed end portion 10b by a retainer 14c mounted on the master piston 11. A large-diameter portion of the other end of the valve rod 14 is slidably disposed in a retainer 14b, and restrained from moving toward the master piston 11. In a small-diameter portion of the stepped opening 11b, a top end portion of an output rod 4 is received. The output rod 4 has an annular groove formed on its outer peripheral surface for receiving an O ring 4a which is disposed in an annular groove formed on the inner surface of the stepped opening 11b. Accordingly, the output rod 4 is held by the O ring 4a within the stepped opening 11b. In a large-diameter portion of the stepped opening 11b, a power piston 5 is received through a seal 5s, whereby the stepped opening 11b is separated from a second boost chamber 20b which will be described later, but communicates with the fluid chamber 13 through a communicating hole 11h which is formed in the large-diameter land portion 11p.

A return spring 14d is mounted between the retainers 14b and 14c so as to bias the master piston 11 away from the closed end portion 10b. Therefore, the opposite ends of the valve rod 14 are normally in engagement with the respective retainers 14b, 14c. Thus, the valve member 14a and the small hole 11d are spaced from each other, so that brake fluid supplied from the reservoir 41 to the fluid chamber 13 through the port 13a is filled in the pressure chamber 12 through the hole 11e of the master piston 11, and the hole 11c, the small hole 11d and the hole 11a. When the master piston 11 is moved toward the closed end portion 10b against the biasing force of the return spring 14d, the hole 11e is closed by the cup seal 11f and the small hole 11d is closed by the valve member 14a, so that the pressure chamber 12 is held in the closed condition except the port 12a. Accordingly, the pressure of the brake fluid in the pressure chamber 12 is increased in response to sliding movement of the master piston 11.

In a housing 1b joined with the housing 1a, there is defined a bore 20h which is substantially coaxial with the cylinder bore 10a, and in which the power piston 5 is fluid-tightly and slidably disposed. A first boost chamber 20a and a second boost chamber 20b are defined in the hydraulic booster 20 and separated from each other by the power piston 5. On the inner surface of the bore 20h, there is formed an annular groove to receive a cup seal 8 which functions as an one-way valve for allowing a flow of brake fluid from the second boost chamber 20b to the first boost chamber 20a. The power piston 5 has a recess 5a formed on its end facing the master piston 11 for receiving the end portion of the output rod 4. This end portion of the output rod 4 is formed on its outer peripheral surface with an annular groove for receiving an O ring 4b which is disposed in an annular groove formed on the inner surface of the recess 5a. Accordingly, the output rod 4 is held by the O ring 4b within the recess 5a.

The power piston 5 is formed in its central axial direction with a bore 5b and a bore 5e which is larger in diameter than the bore 5b. A communication hole is formed in the bottom of the bore 5b, and a reaction piston 22 is slidably received in the bore 5b. In the reaction piston 22, there is formed an elongated hole 22a extending coaxially with the axis of the reaction piston 22, and a through-hole 22b extending perpendicularly to the elongated hole 22a. A pin 5h fixed to the power piston 5 is disposed in the elongated hole 22a, so that the reaction piston 22 is restrained from sliding at least toward the brake pedal 2 relative to the power piston 5. One end of an input rod 3 is connected to the brake pedal 2. The other end of the input rod 3 is provided with a spherical head which is inserted into the bore 5e of the power piston 5 and received in the recess of the reaction piston 22, and which is engaged with the projection formed on the inner surface of the recess. In the power piston 5, there is formed radially a through-hole 5f which is aligned with the through-hole 22b when the reaction piston 22 is positioned most closely to the brake pedal 2 and which is larger in diameter than the through-hole 22b. The power piston 5 is provided with a retainer 6 at its end extending toward the brake pedal 2, and a spring 6a is mounted between the retainer 6 and the housing 1b so as to normally bias the power piston 5 toward the brake pedal 2. The power piston 5 has at its middle portion a shoulder portion which abuts on the housing 1b to prevent the power piston 5 from sliding toward the brake pedal 2.

A support lever 24 is pivotally connected at its one end to the housing 1b by a pin 1c for pivotal movement within the first boost chamber 20a, and a spherical head of the support lever 24 is fitted into the through-hole 22b of the reaction piston 22. And, one head of a control lever 25, which is pivotally connected to the support lever 24 by a pin 24a, is fitted into the through-hole 5f of the power piston 5. On the other head of the control lever 25, there is formed a hole around the pin 1c. Accordingly, when the reaction piston 22 slides toward the output rod 4 relative to the power piston 5 which is urged toward the brake pedal 2, a rotating force is exerted on the support lever 24 so as to pivotally move the support lever 24 clockwise about the pin 1c. At that time, since one head of the control lever 25 is retained in the through-hole 5f of the power piston 5, the other head of the control lever 25 is rotated counterclockwise about the pin 24a and hence moved in the sliding direction of the reaction piston 22. As a result, the other head of the control lever 25 is displaced in response to the movement of the reaction piston 22 until it abuts on the bottom of the bore 5b.

The housing 1b has a spool-valve bore extending substantially in parallel with the power piston 5 and communicating with the first boost chamber 20a, and a spool valve 28 is fitted into the spool-valve bore. The spool valve 28 has a spool 26 which is slidably received in a spool bore 27a formed in a cylinder 27 substantially in parallel with the power piston 5. One end of the spool bore 27a is fluid-tightly plugged by a closure member 27f. The spool 26 has a hole 26a formed axially, and a hole 26b formed radially to communicate with the hole 26a. One end of the spool 26 is positioned in the first boost chamber 20a and connected to one end of a control rod 29. The other end of the control rod 29 is slidably mounted on a recess formed in the housing 1b, and the head of the control lever 25 is fitted into a through-hole 29a radially bored in the control rod 29. Between the cylinder 27 and a retainer 29b supported at one end of the control rod 29, a spring 29c is mounted so as to normally bias the spool 26 toward the pin 1c. The hole 26a normally opens to the first boost chamber 20a at the junction of the spool 26 and the control rod 29. When the control lever 25 is in its initial position, the hole 26a of the spool 26 communicates with the reservoir 41 through a hole 27b radially bored in the cylinder 27. Thus, the first boost chamber 20a also communicates with the reservoir 41 and is filled with the brake fluid under the atmospheric pressure. A hole 27c communicating with the power source 40 is formed in the cylinder 27 with a predetermined distance from the hole 27b toward the control rod 29. The hole 27c is closed by the peripheral surface of the spool 26 in a position thereof as shown in FIG. 1. Between the hole 27c and the one end of the spool 26 facing the control rod 29, an annular groove 27e is formed on the inner surface of the cylinder 27, and an annular groove 26c is formed on the peripheral outer surface of the spool 26 in opposed relationship with the annular groove 27e.

When the spool 26 is moved toward the closure member 27f in response to the movement of the control lever 25, the hole 27b of the cylinder 27 is closed. The hole 27c in turn faces the annular groove 26c of the spool 26, and the annular groove 27e faces the hole 26b. Consequently, the hole 27c communicates with the hole 26a. Thus, the hydraulic power pressure of the power source 40 is introduced into the first boost chamber 20a to increase the hydraulic pressure therein, so that the reaction force is thereby transmitted to the brake pedal 2 through the reaction piston 22, and simultaneously the increased hydraulic pressure is applied to the master piston 11 through the power piston 5. The power piston 5 moves until the pin 5h comes into contact with the end portion of the elongated hole 22a at maximum relative to the reaction piston 22. Thereby, the relative position of the control lever 25 and the support lever 24 becomes that in the initial condition. Accordingly, the control lever 25 is moved clockwise to retract the control rod 29 toward the brake pedal 2. Then, the hole 27c of the cylinder 27 is closed, and in turn the hole 27b communicates with the hole 26a of the spool 26 to lower the hydraulic pressure in the first boost chamber 20a, so that the power piston 5 is moved toward the brake pedal 2. With this operation performed repeatedly, the hydraulic power pressure within the first boost chamber 20a is regulated so as to boost the master cylinder 10.

The first boost chamber 20a of the hydraulic booster 20 communicates with one circuit of the dual circuits system in the present embodiment, that is, it communicates with the wheel brake cylinders 53a, 54a mounted on the rear road wheels 53, 54 through the hydraulic circuit 72. The first boost chamber 20a also communicates with the second boost chamber 20b through the hydraulic circuits 72, 73 and a pressure reducing value 70. On the other hand, the pressure chamber 12 of the master cylinder 10 is connected to the other circuit, that is, it communicates with the wheel brake cylinders 51a, 52a mounted on the front road wheels 51, 52 through the hydraulic circuit 71. The pressure reducing valve 70 of a well known type is provided with a valve member 70a and a spring 70b to function as the delay valve according to the present invention. Through this pressure reducing valve 70, it will take a predetermined time until the hydraulic pressure discharged from the first boost chamber 20a is supplied to the second boost chamber 20b against the biasing force of the spring 70b with a predetermined pressure reduced.

The power source 40 comprises a fluid pump 43 driven by an electric motor 42 and is so structured that its input side is connected to the reservoir 41 while its output side is connected to an accumulator 44 via a check valve 45, and the hydraulic power pressure is supplied to necessary portions through the accumulator 44. Further, the electric motor 42 is intermittently controlled in response to a signal of a pressure sensor (not shown), so that the hydraulic power pressure is maintained to be at a predetermined value.

The operation of the above described embodiment will now be explained. When the brake pedal 2 is not depressed as shown in FIG. 1, the pressure chamber 12 of the master cylinder 10 communicates with the fluid chamber 13, the former communicating with the wheel brake cylinders 51a, 52a and the latter communicating with the reservoir 41 respectively, so that the brake fluid filled in these chambers is under a pressure equal to the pressure in the reservoir 41, that is, substantially under the atmospheric pressure. When the power source 40 operates, the hydraulic power pressure is applied to the hole 27c of the hydraulic booster 20. However, the hydraulic booster 20 is inoperative as long as the hole 27c is closed as shown in FIG. 1. In this condition, the first boost chamber 20a of the hydraulic booster 20 communicates with the reservoir 41 through the communication hole 27b and is substantially under the atmospheric pressure, so that the wheel brake cylinders 53a, 54a which communicate with the first boost chamber 20a through the hydraulic circuit 72 are also under the atmospheric pressure.

When the brake pedal 2 is depressed, the reaction piston 22 is pushed by the input rod 3. And, when the reaction piston 22 is moved until it abuts on the power piston 5, the control lever 25 is rotated counterclockwise relative to the support lever 24 so that the head of the control lever 25 pushes the spool 26. Thereby, the hydraulic power pressure is introduced from the power source 40 into the first boost chamber 20a to push the power piston 5, so that the boost force is applied to the master piston 11, and the reaction force is transmitted to the brake pedal 2 via the reaction piston 22. Simultaneously, the hydraulic pressure is supplied from the port 20d to the wheel brake cylinders 53a, 54a directly, and to the second boost chamber 20b through the pressure reducing valve 70 as well. The hydraulic pressure in the first boost chamber 20a is regulated to a predetermined hydraulic pressure with the spool valve 28 operated by the control lever 25 in response to the relative displacement of the power piston 5 to the reaction piston 22.

Figure 2:
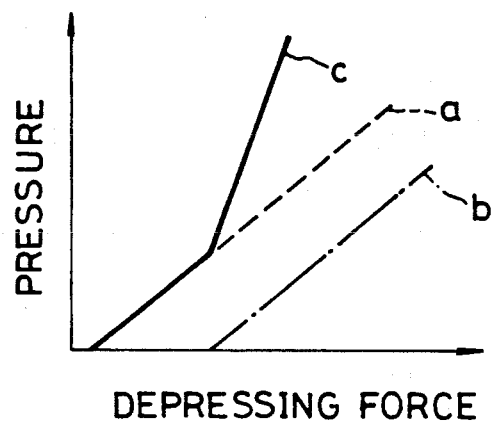
FIG. 2 is a diagram showing a relationship between a pressure applied to a master cylinder and a depressing force applied on a brake pedal according to the first embodiment.

When the hydraulic pressure discharged from the first boost chamber 20a is supplied to the second pressure chamber 20b, the pressure is applied to the master piston 11 through the large-diameter land portion 11p thereof, that is, the boosting force of the hydraulic booster 20 is increased by that amount. The boosting force to be added is delayed by the pressure reducing valve 70, and reduced by a predetermined value, so that the pressure applied to the master piston 11 will not be increased immediately, but will be increased gradually in response to the increase of the hydraulic pressure supplied to the second boost chamber 20b. The pressure applied to the master piston 11 only by the power piston 5 has a characteristic indicated by a phantom line (a) in FIG. 2, whereas the pressure applied to the master piston 11 with the hydraulic pressure supplied to the second boost chamber 20b has a characteristic indicated by an one-dotted chain line (b) in FIG. 2. According to the present embodiment, therefore, a characteristic indicated by a solid line (c) in FIG. 2 is obtained with the above characteristics (a) and (b) combined together. In FIG. 2, the abscissa represents the depressing force applied on the brake pedal 2, and the ordinate represents the pressure applied to the master piston 11, i.e., a force corresponding to the hydraulic braking pressure applied to the wheel brake cylinders 51a, 52a. When the master piston 11 starts to slide in response to the hydraulic pressure in the first and second boost chambers 20a, 20b, the small hole 11d is closed by the valve member 14a, and then the hydraulic braking pressure is discharged to each of the wheel brake cylinders 51a, 52a in accordance with the reduction of volume of the pressure chamber 12. When the depressing force of the brake pedal 2 is released, the present embodiment operates in the reverse manner and returns to the condition shown in FIG. 1.

As described in the above, in one of the dual circuits, i.e., at the front road wheels' side, the braking operation is performed in response to the hydraulic braking pressure discharged from the master cylinder 11, whereas it is performed in response to the hydraulic pressure discharged from the hydraulic booster 20 in the other circuit, i.e., at the rear road wheels' side. Consequently, a quick braking operation with a shortened stroke of the brake pedal 2 is achieved. Moreover, the hydraulic braking pressure in the wheel brake cylinders 51a, 52a at the front road wheels' side is made variable by means of the pressure reducing valve 70, and it may be set in a predetermined relationship with the hydraulic braking pressure in the wheel braking cylinders 53a, 54a at the rear road wheels' side. Therefore, the braking force distribution between the front and rear road wheels is properly set, so that a proportioning valve usually disposed at the rear road wheels' side may be omitted.

Figure 3:
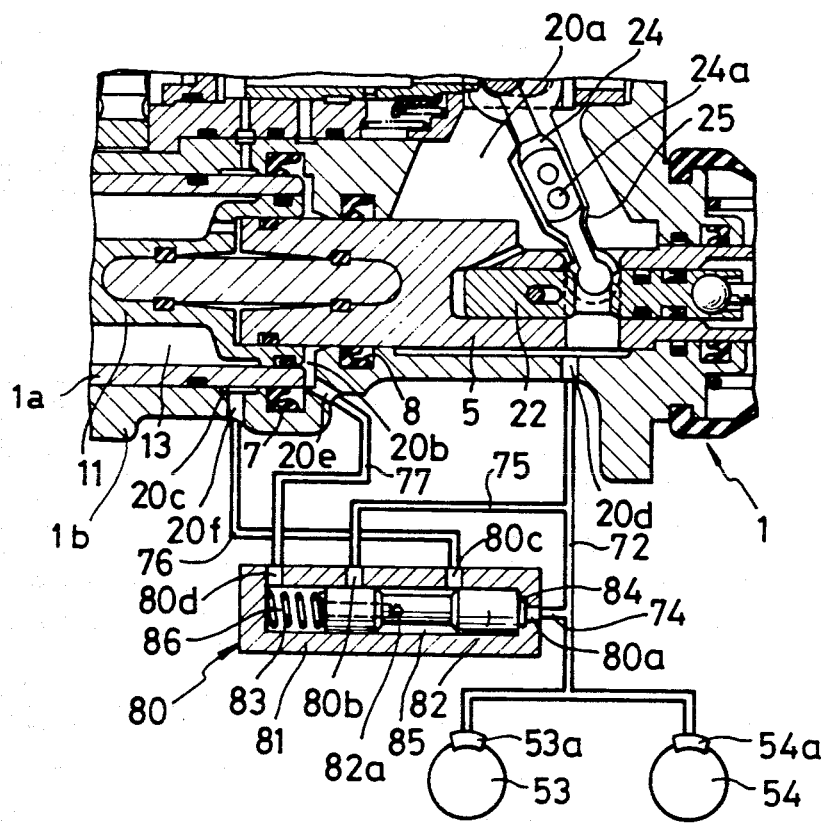
FIG. 3 is a schematic illustration of a hydraulic braking system of a second embodiment of the present invention.

FIG. 3 shows another embodiment of the present invention, in which the pressure generator 1 is the same as that shown in FIG. 1, so that only a part of it is shown, and the remaining portions are omitted. In this embodiment, an annular chamber 20c is defined between the housings 1a and 1b of the pressure generator 1, and a port 20f is formed in the housing 1a to communicate with the reservoir 41 through the annular chamber 20c and the port 27b shown in FIG. 1. In lieu of the pressure reducing valve 70, this embodiment is provided with a pressure control valve 80. The pressure control valve 80 is formed of a spool valve which includes a cylinder 81 having a bore defined therein, a piston 82 slidably received in the bore and a spring 83 received in the bore for biasing the piston 82. The piston 82 is provided with two land portions on its opposite ends, so that the bore of the cylinder 81 is divided into a first chamber 84, second chamber 85 and third chamber 86. The first chamber 84 communicates with the first boost chamber 20a of the hydraulic booster 20 through a port 80a, the hydraulic circuits 74, 72 and the port 20d. The second chamber 85 communicates with a port 80c at the initial position of the piston 82, and communicates with a port 80b or the port 80c in response to the sliding movement of the piston 82. The port 80b is connected to the port 20d through the hydraulic circuits 75, 72, and the port 80c is connected to a port 20f through the hydraulic circuit 76 to communicate with the reservoir 41 through the annular chamber 20c. The third chamber 86 communicates with the second boost chamber 20b through a port 80d, a hydraulic circuit 77 and a port 20e. The spring 83 is disposed in the third chamber 86 to bias the piston 82 toward the first chamber 84. The piston 82 is formed with a through-hole 82a through which the second chamber 85 and the third chamber 86 always communicate with each other. Accordingly, in the pressure control valve 80, the piston 82 is biased by the spring 83 to be positioned as shown in FIG. 3 at its initial position when the hydraulic booster 20 does not operate, so that the second boost chamber 20b communicates with the reservoir 41 through the hydraulic circuit 77, the third chamber 86, the through-hole 82a, the second chamber 85, the port 80c, the hydraulic circuit 76 and the port 20f.

In operation of the above embodiment, when the hydraulic pressure discharged from the first boost chamber hydraulic circuits 72, 74, the hydraulic pressure in the first chamber 84 increases to move the piston 82 against the biasing force of the spring 83. If the hydraulic pressure in the first chamber 84 is equal to or more than a predetermined pressure value, the port 80c is closed by one of the land portions of the piston 82, and the port 80b opens to communicate with the second chamber 85. Consequently, the hydraulic pressure discharged from the first boost chamber 20a is supplied to the second chamber 85 and transmitted to the second boost chamber 20b through the through-hole 82a of the piston 82, the third chamber 86, the port 80d, the hydraulic circuit 77 and the port 20e. The hydraulic pressure in the second boost chamber 20b increases in response to increase of the opening area of the port 80b in accordance with the sliding movement of the piston 82. Thus, the hydraulic pressure transmitted to the second boost chamber 20b increases in proportion to increase of the hydraulic pressure discharged from the first boost chamber 20a.

Figure 4A:
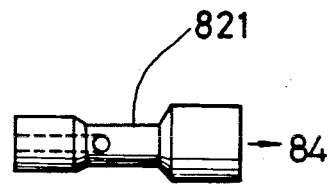
FIG. 4(a) is another embodiment of the piston for use in the pressure control valve shown in FIG. 3.
Figure 4B:
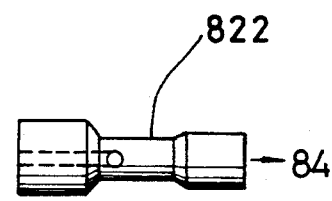
FIG. 4(b) is a further embodiment of the piston for use in the pressure control valve shown in FIG. 3.
Figure 5:
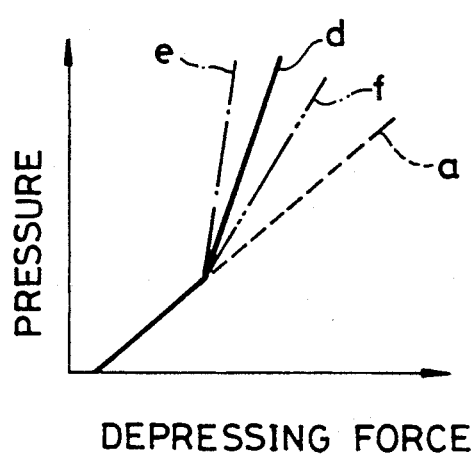
FIG. 5 is a diagram showing a relationship between a pressure applied to a master cylinder and a depressing force applied on a brake pedal according to the second embodiment.

FIG. 5 shows various characteristics of the pressure applied to the master piston 11 in response to the depressing force applied on the brake pedal 2, wherein a solid line "d" represents the characteristic of the embodiment shown in FIG. 3. The increasing rate in the characteristic of "d" may be modified by varying the diameters of the land portions of the piston 82 to be a desired rate. The characteristic of "e" in FIG. 5 will be obtained, in the case where the pressure control valve 80 is provided with a piston 821 having a land portion at the side of the first chamber 84 larger in diameter than that at the other side as shown in FIG. 4(a) and a cylinder (not shown) having a stepped bore for receiving the piston 821 fluid-tightly and slidably, and where a seal member having no one-way valve function is disposed in lieu of the cup seal 8 in FIG. 3. Whereas, the characteristic of "f" in FIG. 5 will be obtained, in the case where the pressure control valve 80 is provided with a piston 822 having a land portion at the side of the first chamber 84 smaller in diameter than the land portion at the other side as shown in FIG. 4(b). In the above-described embodiment shown in FIG. 3, a spool valve is employed as the pressure control valve 80, while a regulator valve such as a poppet valve may be employed. The hydraulic pressure discharged from the power source 40 may be supplied to the second chamber 85 of the pressure control valve 80 as a boost pressure, in lieu of the hydraulic pressure discharged from the first boost chamber 20a.

Figure 6:
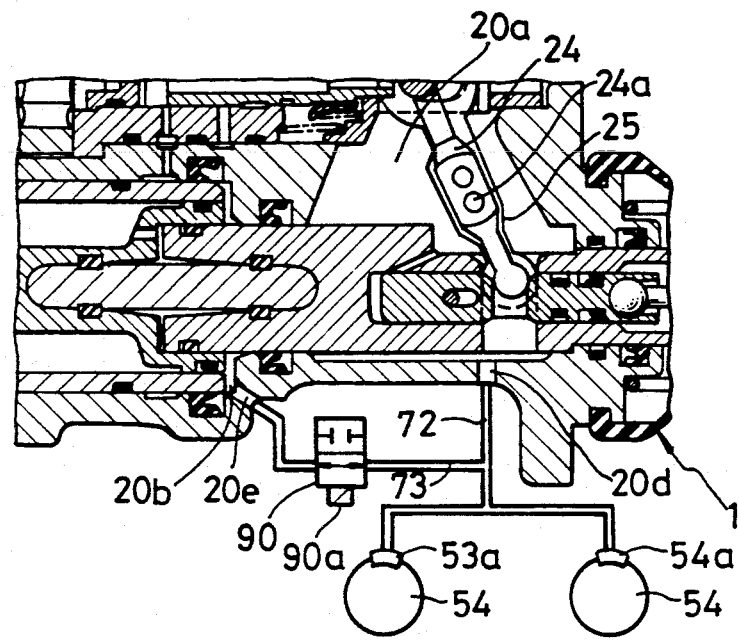
FIG. 6 is a schematic illustration of a hydraulic braking system of a third embodiment of the present invention.
Figure 9:
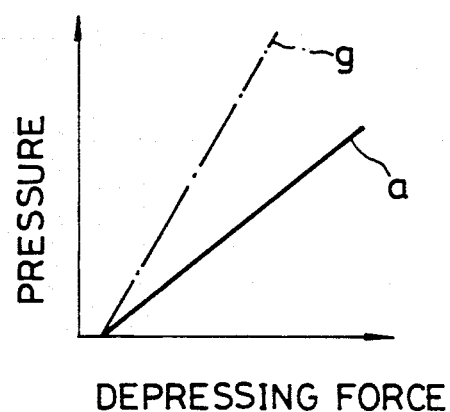
FIG. 9 is a diagram showing a relationship between a pressure applied to a master cylinder and a depressing force applied on a brake pedal according to the third embodiment shown in FIG. 6.
Figure 10:
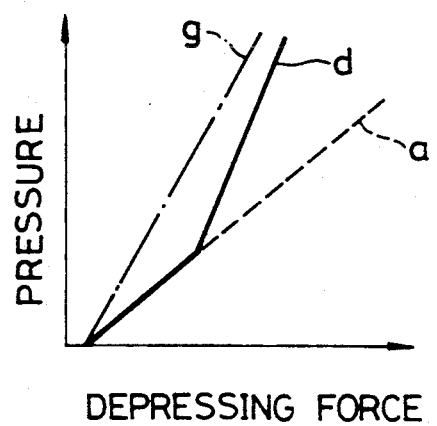
FIG. 10 is a diagram showing a relationship between a pressure applied to a master cylinder and a depressing force applied on a brake pedal according to the fifth embodiment shown in FIG. 8.

FIG. 6 shows a further embodiment of the present invention, in which a closing valve 90 is provided in lieu of the pressure reducing valve 70 in FIG. 1. The closing valve 90 is formed of a two positions electromagnetic changeover valve which is positioned in a first operating position as shown in FIG. 6 when a solenoid 90a is de-energized, or positioned in a second operating position for closing the hydraulic circuit 73 when the solenoid 90a is energized. Accordingly, the pressure applied to the master piston 11 varies in response to the depressing force on the brake pedal 2, in such a manner that a characteristic of "a" in FIG. 9 is selected when the closing valve 90 is in its ON condition with the solenoid 90a energized, whereas a characteristic of "g" is selected when the closing valve 90 is in its OFF condition with the solenoid 90a de-energized. According to the present embodiment, therefore, the characteristic of "a" or "g" is selected by energizing or de-energizing the solenoid 90a of the closing valve 90.

Figure 7:
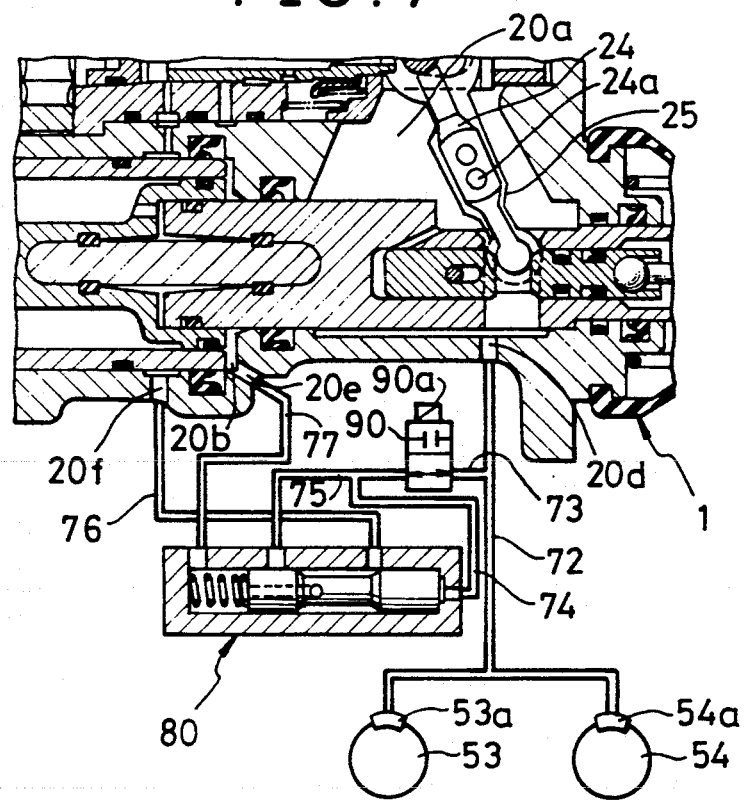
FIG. 7 is a schematic illustration of a hydraulic braking system of a fourth embodiment of the present invention.

FIG. 7 illustrates an embodiment of a combination of the embodiments shown in FIGS. 3 and 6, wherein the closing valve 90 is disposed between the hydraulic circuits 74, 75 and the hydraulic circuit 72 of the system shown in FIG. 3. Accordingly, when the closing valve 90 is in its OFF condition, i.e., at the initial position as shown in FIG. 7, the characteristic of "d" in FIG. 5 is selected. When the closing valve 90 is in its ON condition, the characteristic of "a" in FIG. 5 is selected.

Figure 8:
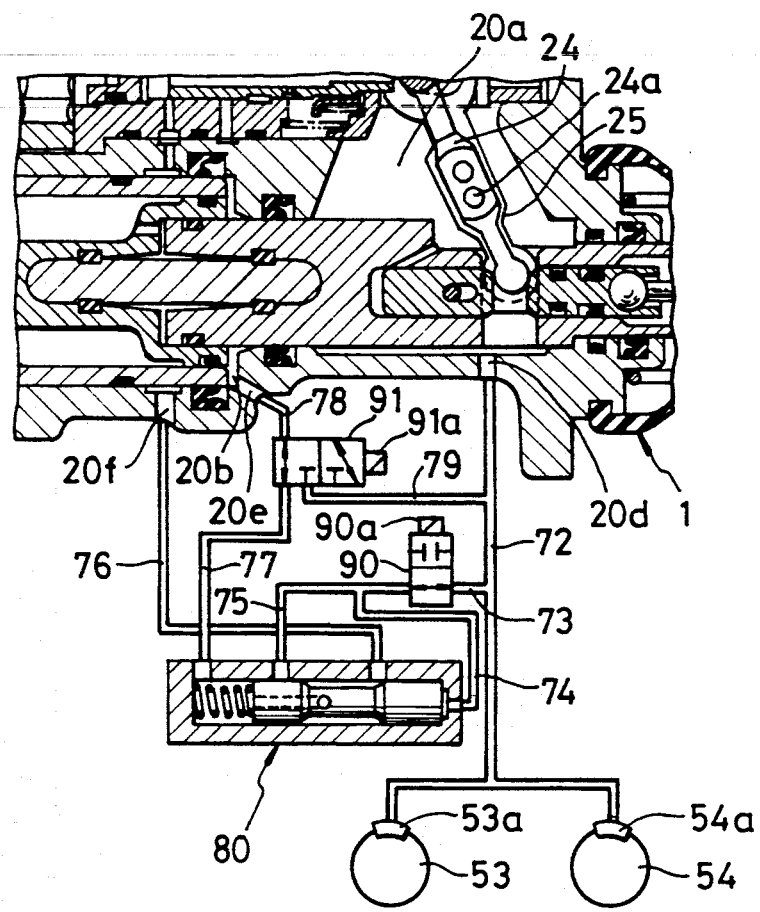
FIG. 8 is a schematic illustration of a hydraulic braking system of a fifth embodiment of the present invention.

In FIG. 8, there is illustrated a further embodiment which incorporates into the embodiment in FIG. 7 a changeover valve 91 of a three ports—two positions electromagnetic valve disposed in the hydraulic circuit 77. The changeover valve 91 is connected to the hydraulic circuit 72 through a hydraulic circuit 79, so that when the changeover valve 91 is in its OFF condition with the solenoid 91a de-energized, the hydraulic circuit 77 communicates with the port 20e through the hydraulic circuit 78, while the hydraulic circuit 79 is closed. When the changeover valve 91 is in its ON condition with the solenoid 91a energized, the communication between the hydraulic circuits 77, 78 are blocked, and in turn the hydraulic circuit 79 communicates with the port 20e through the hydraulic circuit 78. Accordingly, with each of the closing valve 90 and the changeover valve 91 operated in accordance with the following Table 1, one of the characteristics of "a", "d" and "g" is selected.

TABLE 1

| closing valve 90 | changeover valve 91 | characteristic |
|---|---|---|
| OFF | OFF | d |
| OFF/ON | ON | g |
| ON | OFF | a |

In the above Table 1, "ON" represents the condition of the closing valve 90 or the changeover valve 91 when each of the solenoid valves 90a, 91a is energized respectively.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle comprising:
   a power source for generating a hydraulic power pressure;
   a reservoir for storing an amount of brake fluid;
   a master cylinder having a bore defined therein and a master piston slidably disposed in said bore for introducing said brake fluid into said bore from said reservoir and generating a hydraulic braking pressure in response to operation of a manually-operated member;
   a hydraulic booster having a housing defining therein a first boost chamber and a power piston slidably supported in said housing for actuating said master cylinder with said hydraulic power pressure supplied into said first boost chamber from said power source in response to operation of said manually-operated member, said hydraulic booster defining therein a second boost chamber separated from said first boost chamber by said power piston and connected with said first boost chamber through a hydraulic circuit for introducing a hydraulic pressure from said first boost chamber and actuating said master piston independently of said power piston, said master piston having a large-diameter land portion and a small-diameter land portion, and said bore being formed of a stepped bore having a large-diameter portion and small-diameter portion corresponding to each of said land portions, said master piston having an opening formed on an end face of said large-diameter land portion extending axially toward a center of said master piston for receiving therein power piston fluid-tightly and slidably, and said second boost chamber being defined around said power piston so that the end face of said large-diameter land portion of said master piston faces said second boost chamber;
   valve means disposed in said hydraulic circuit between said first boost chamber and said second boost chamber for controlling the communication therebetween; and
   a plurality of wheel brake cylinders communicated with at least said master cylinder for braking respective road wheels.

2. A hydraulic braking system for an automotive vehicle as set forth in claim 1, wherein said power piston has a recess formed on the end face thereof facing said master piston, and said master piston has a recess formed on the bottom of said opening coaxially with said recess of said power piston, and wherein an output rod is disposed in said recesses of said power piston and said master piston.

3. A hydraulic braking system for an automotive vehicle as set forth in claim 2, wherein a first O ring is disposed between said output rod and said recess of said master piston, and a second O ring is disposed between said output rod and said recess of said power piston, whereby said output rod is held in said recesses.

4. A hydraulic braking system for an automotive vehicle as set forth in claim 3, wherein a cup seal is disposed between said power piston and a portion of said housing supporting said power piston for blocking a flow of brake fluid from said first boost chamber to said second boost chamber and allowing the reverse flow thereof when the hydraulic pressure in said second boost chamber exceeds that in said the first boost chamber.

5. A hydraulic braking system for an automotive vehicle as set forth in claim 4, wherein said valve means comprises a delay valve for blocking the communication between said first boost chamber and second boost chamber until a hydraulic pressure in said first boost chamber exceeds a predetermined value.

6. A hydraulic braking system for an automotive vehicle comprising:
   a power source for generating a hydraulic power pressure;
   a reservoir for storing an amount of brake fluid;
   a master cylinder having a bore defined therein and a master piston slidably disposed in said bore for introducing said brake fluid into said bore from said reservoir and generating a hydraulic braking pressure in response to operation of a manually-operated member;
   a hydraulic booster having a housing defining therein a first boost chamber and a power piston slidably supported in said housing for actuating said master cylinder with said hydraulic power pressure supplied into said first boost chamber from said power source in response to operation of said manually-operated member, said hydraulic booster defining therein a second boost chamber separated from said first boost chamber by said power piston and connected with said first boost chamber through a hydraulic circuit for introducing a hydraulic pressure from said first boost chamber and actuating said master piston independently of said power piston;
   valve means disposed in said hydraulic circuit between said first boost chamber and said second boost chamber for controlling the communication therebetween, said valve means including a pressure control valve for controlling a hydraulic pressure supplied to said second boost chamber in response to hydraulic pressure discharged from said first boost chamber, said pressure control valve including a cylinder having a bore defined therein, a piston having first and second land portions on opposite ends thereof and slidably received in said bore, and a spring received in said bore for biasing said piston, said piston forming in said bore a first chamber between said first land portion and said cylinder, a second chamber between said first and second land portions and a third chamber between said second land portion and said cylinder, said first chamber communicating with said first boost chamber of said hydraulic booster, said third chamber communicating with said second boost chamber, and said second chamber communicating with said first boost chamber or said reservoir in response to sliding movement of said piston; and
   a plurality of wheel brake cylinders communicated with at least said master cylinder for braking respective road wheels.

7. A hydraulic braking system for an automotive vehicle as set forth in claim 6, wherein said first land portion is larger in diameter than said second land portion.

8. A hydraulic braking system for an automotive vehicle as set forth in claim 6, wherein said first land portion is smaller in diameter than said second land portion.

9. A hydraulic braking system for an automotive vehicle comprising:

a power source for generating a hydraulic power pressure;

a reservoir for storing an amount of brake fluid;

a master cylinder having a bore defined therein and a master piston slidably disposed in said bore for introducing said brake fluid into said bore from said reservoir and generating a hydraulic braking pressure in response to operation of a manually-operated member;

a hydraulic booster having a housing defining therein a first boost chamber and a power piston slidably supported in said housing for actuating said master cylinder with said hydraulic power pressure supplied into said first boost chamber from said power source in response to operation of said manually-operated member, said hydraulic booster defining therein a second boost chamber separated from said first boost chamber by said power piston and connected with said first boost chamber through a hydraulic circuit for introducing a hydraulic pressure from said first boost chamber and actuating said master piston independently of said power piston;

valve means disposed in said hydraulic circuit between said first boost chamber and said second boost chamber for controlling the communication therebetween, said valve means including a pressure control valve for controlling a hydraulic pressure supplied to said second boost chamber in response to hydraulic pressure discharged from said first boost chamber, said pressure control valve including a cylinder having a bore defined therein, a piston having first and second land portions on opposite ends thereof and slidably received in said bore, and a spring received in said bore for biasing said piston, said piston forming in said bore a first chamber between said first land portion and said cylinder, a second chamber between said first and second land portions and a third chamber between said second land portion and said cylinder, said first chamber communicating with said first boost chamber of said hydraulic booster, said third chamber communicating with said second boost chamber, and said second chamber communicating with said first boost chamber or said reservoir in response to sliding movement of said piston; and a plurality of wheel brake cylinders communicated with at least said master cylinder for braking respective road wheels.

10. A hydraulic braking system for an automotive vehicle comprising:

a power source for generating a hydraulic power pressure;

a reservoir for storing an amount of brake fluid;

a master cylinder having a bore defined therein and a master piston slidably disposed in said bore for introducing said brake fluid into said bore from said reservoir and generating a hydraulic braking pressure in response to operation of a manually-operated member;

a hydraulic booster having a housing defining therein a first boost chamber and a power piston slidably supported in said housing for actuating said master cylinder with said hydraulic power pressure supplied into said first boost chamber from said power source in response to operation of said manually-operated member, said hydraulic booster defining therein a second boost chamber separated from said first boost chamber by said power piston and connected with said first boost chamber through a hydraulic circuit for introducing a hydraulic pressure from said first boost chamber and actuating said master piston independently of said power piston;

valve means disposed in said hydraulic circuit between said first boost chamber and said second boost chamber for controlling the communication therebetween, said valve means including a pressure control valve for controlling a hydraulic pressure supplied to said second boost chamber in response to hydraulic pressure discharged from said first boost chamber, a changeover valve disposed between said first boost chamber of said hydraulic booster and said pressure control valve, said changeover valve being selectively placed in one of a first operating position for communicating said first boost chamber with said pressure control valve and a second operating position for blocking the communication therebetween; and a plurality of wheel brake cylinders communicated with at least said master cylinder for braking respective road wheels.

11. A hydraulic braking system for an automotive vehicle as set forth in claim 10, further comprising a second changeover valve disposed between said first boost chamber and said second boost chamber of said hydraulic booster and connected to said pressure control valve, said second changeover valve being selectively placed in one of a first operating position for communicating said second boost chamber with said pressure control valve and blocking the communication between said first boost chamber and second boost chamber, and a second operating position for communicating said second boost chamber with said first boost chamber and blocking the communication between said second boost chamber and said pressure control valve.

* * * * *